United States Patent
Hu

(10) Patent No.: US 10,866,606 B2
(45) Date of Patent: Dec. 15, 2020

(54) METHODS AND APPARATUSES FOR MULTIPLE-MODE LOW DROP OUT REGULATORS

(71) Applicant: QUALCOMM Incorporated, San Diego, CA (US)

(72) Inventor: Anqiao Hu, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/938,942

(22) Filed: Mar. 28, 2018

(65) Prior Publication Data

US 2019/0302819 A1 Oct. 3, 2019

(51) Int. Cl.
| | |
|---|---|
| *G05F 1/575* | (2006.01) |
| *G05F 3/24* | (2006.01) |
| *H02M 3/335* | (2006.01) |
| *H02M 3/156* | (2006.01) |
| *H02M 3/157* | (2006.01) |

(52) U.S. Cl.
CPC ............... *G05F 1/575* (2013.01); *G05F 3/24* (2013.01); *H02M 3/157* (2013.01); *H02M 3/1563* (2013.01); *H02M 3/33523* (2013.01)

(58) Field of Classification Search
CPC ........ G05F 1/575; G05F 3/24; H02M 3/1563; H02M 3/157; H02M 3/33523
See application file for complete search history.

(56) References Cited

U.S. PATENT DOCUMENTS

| | | | | |
|---|---|---|---|---|
| 7,961,546 B2 * | 6/2011 | Mair | ...................... | G11C 5/147 365/226 |
| 8,080,984 B1 * | 12/2011 | Geynet | ...................... | G05F 1/56 323/280 |
| 8,278,978 B1 * | 10/2012 | Wright | ...................... | G06F 1/24 327/143 |
| 2004/0257151 A1 * | 12/2004 | Chan | ......................... | G05F 3/24 327/540 |
| 2008/0054721 A1 * | 3/2008 | Frew | ......................... | H02J 1/10 307/52 |
| 2012/0086490 A1 * | 4/2012 | Doo | ................. | H03K 19/00361 327/291 |
| 2013/0099764 A1 * | 4/2013 | Zhang | ...................... | G05F 1/575 323/273 |
| 2014/0084896 A1 * | 3/2014 | Zhang | ...................... | G05F 1/56 323/311 |
| 2014/0344589 A1 * | 11/2014 | Muthukaruppan | ..... | H02M 3/07 713/300 |
| 2015/0050900 A1 * | 2/2015 | Zhang | ...................... | H02M 1/08 455/127.1 |
| 2018/0375434 A1 * | 12/2018 | Biziitu | .................... | G05F 1/577 |

* cited by examiner

*Primary Examiner* — Thienvu V Tran
*Assistant Examiner* — Bart Iliya

(57) ABSTRACT

Aspects of the present disclosure generally relate to multi-mode voltage regulators. For example, the regulator may include a first voltage regulator configured to operate in a first power mode. The first voltage regulator is further configured to selectively adjust an output voltage using one of a voltage output of a replica pass transistor of the first voltage regulator or a voltage output of the pass transistor of the first voltage regulator based on a transition from a second power mode to the first power mode.

28 Claims, 6 Drawing Sheets

METHODS AND APPARATUSES FOR MULTIPLE-MODE LOW DROP OUT REGULATORS

TECHNICAL FIELD

Certain aspects of the present disclosure generally relate to electronic circuits and, more particularly, to a circuit for a multiple-mode regulator.

BACKGROUND

Power management integrated circuits (power management ICs or PMICs) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as DC to DC conversion, battery charging, power-source selection, voltage scaling, power sequencing, etc. A PMIC may operate the battery-operated device in multiple different power modes depending on the operational requirements of the device. For example, a PMIC may include a multiple-mode low-dropout (LDO) regulator. The multiple-mode LDO regulator may operate in a low-power mode with increased power efficiency or may operate in a high-power mode with increased operational performance. Accordingly, a PMIC can select between higher power efficiency or performance when using a multiple-mode LDO regulator.

FIG. 1 illustrates a block diagram of a prior art dual mode low voltage dropout (LDO) regulator 100. The dual mode LDO regulator 100 includes a high-power (HP) LDO module 102 and a low-power (LP) LDO module 104. Each of the LDO modules 102, 104 have an input configured to receive an input voltage (Vin) and an output configured to produce an output voltage (Vout). The HP LDO module 102 is further configured to receive a high-power enable signal (EN_HP) configured to enable the HP LDO module 102 to regulate Vout. Similarly, the LP LDO module 104 is configured to receive a low-power enable signal (EN_LP) configured to enable the LP LDO module 104 to regulate Vout. During mode transitions between the power modes, the HP LDO module 102 and LP LDO module 104 are both enabled for a period of time (i.e., transition period). As both of the HP LDO module 102 and LP LDO module 104 regulate Vout at sense point 106 using respective feedback loops (not shown), each of the LDO modules 102, 104 may make a different decision on regulating Vout. As a result, when the transition period expires and only one LDO module is enabled, Vout may experience a voltage dip or overshoot due to a mismatch in the regulation between the LDO modules 102, 104. A large enough voltage dip or overshoot of Vout may cause the PMIC to reset the battery-operated device.

Accordingly, there is a need for multiple-mode regulators with an improved output voltage response during power mode transitions.

SUMMARY

Certain aspects of the present disclosure generally relate to a multiple-mode regulation using replica devices.

Certain aspects of the present disclosure provide a multiple-mode voltage regulator. The multiple-mode voltage regulator generally includes a first voltage regulator having a first transistor having an output coupled to a voltage output of the multiple-mode voltage regulator, a second transistor having an output; and an error amplifier having a first input coupled to a first reference voltage, a second input configured to be selectively coupled between either the voltage output of the multiple-mode voltage regulator or the output of the second transistor, and an output coupled to a gate of the first transistor and a gate of the second transistor, and a second voltage regulator having an output coupled to the voltage output of the multiple-mode voltage regulator.

Certain aspects of the present disclosure provide for a method of multiple-mode voltage regulation. The method generally includes determining an occurrence of a transition between a first power mode and a second power mode of a multiple-mode voltage regulator, regulating an output voltage of a voltage regulator associated with the second power mode using a voltage output of a replica device based on the determination, and regulating the output voltage of the voltage regulator using a voltage output of the multiple-mode voltage regulator after a period of time following the determination.

Certain aspects of the present disclosure provide for a multiple-mode voltage regulator. The multiple-mode voltage regulator generally includes a first low dropout (LDO) regulator configured to operate in a first power mode, the first LDO further configured to selectively adjust an output voltage using one of a voltage output of a replica pass transistor of the first LDO or a voltage output of a pass transistor of the first LDO based on a transition from a second power mode to the first power mode.

Certain aspects of the present disclosure provide for a multiple-mode voltage regulator. The multiple-mode voltage regulator generally includes means for determining an occurrence of a transition between a first power mode and a second power mode, means for regulating an output voltage associated with the first power mode of the multiple-mode voltage regulator, and means for regulating an output voltage associated with the second power mode of the multiple-mode voltage regulator using either a voltage output of a replica device or a voltage output of the multiple-mode voltage regulator based on the determined occurrence of the transition.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Wireless System

Figure 2:
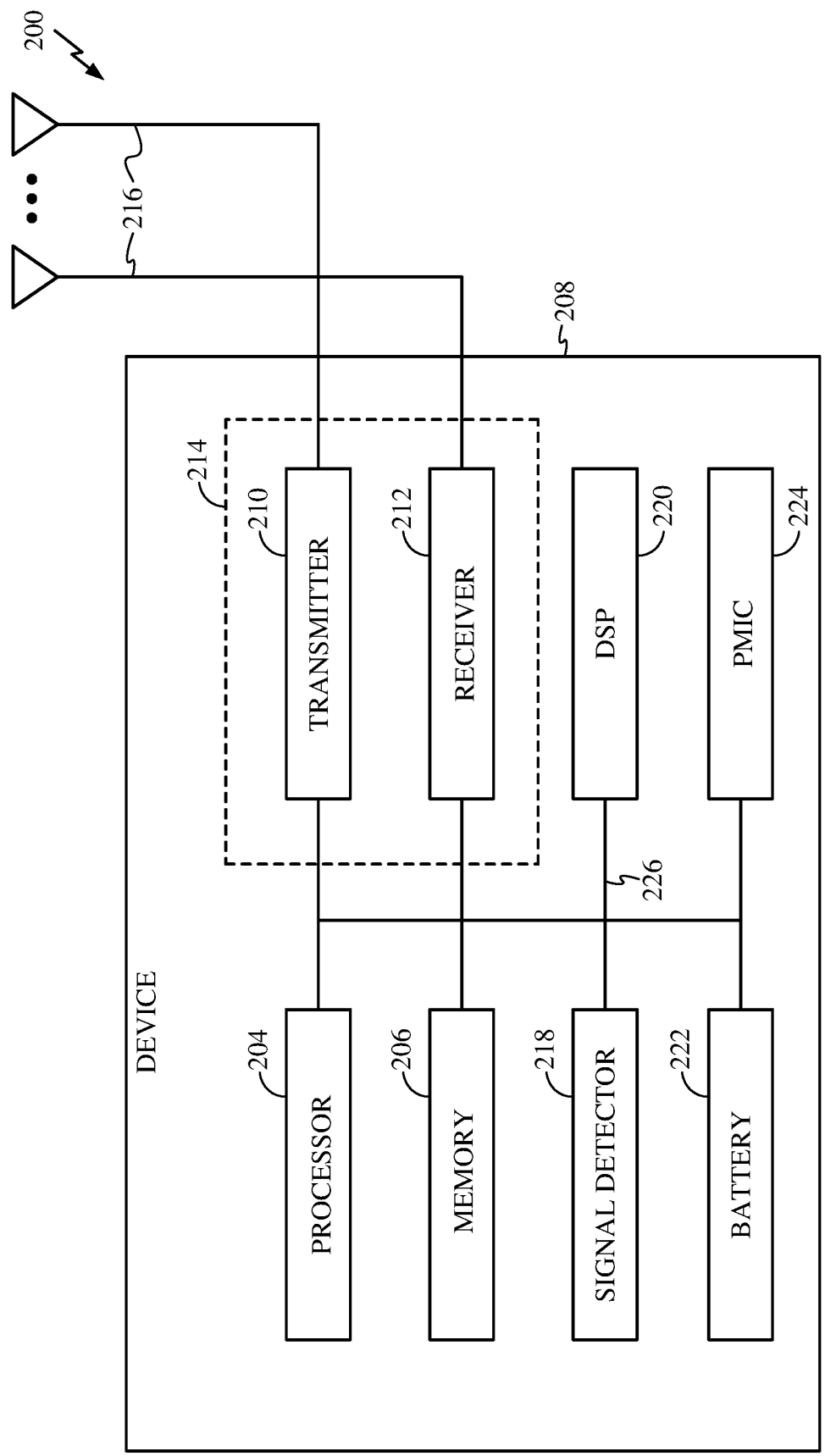
FIG. 2 illustrates a block diagram of an example device including a voltage regulator, according to certain aspects of the present disclosure.

FIG. 2 illustrates a device 200. The device 200 may be a battery-operated device such as a cellular phone, a personal digital assistant (PDA), a handheld device, a wireless modem, a laptop computer, a tablet, a personal computer, etc. The device 200 is an example of a device that may be configured to implement the various systems and methods described herein.

The device 200 may include a processor 204 which controls operation of the device 200. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The device 200 may also include a housing 208 that may include a transmitter 210 and a receiver 212 to allow transmission and reception of data between the device 200 and a remote location. The transmitter 210 and receiver 212 may be combined into a transceiver 214. A plurality of transmit antennas 216 may be attached to the housing 208 and electrically coupled to the transceiver 214. The device 200 may also include (not shown) multiple transmitters, multiple receivers, and multiple transceivers.

The device 200 may also include a signal detector 218 that may be used in an effort to detect and quantify the level of signals received by the transceiver 214. The signal detector 218 may detect such signal characteristics as total energy, energy per subcarrier per symbol, power spectral density and other signals. The device 200 may also include a digital signal processor (DSP) 220 for use in processing signals.

The device 200 may further include a battery 222 used to power the various components of the device 200. The device 200 may also include a power management integrated circuit (power management IC or PMIC) 224 for managing the power from the battery to the various components of the device 200. The PMIC 224 may perform a variety of functions for the device such as DC to DC conversion, battery charging, power-source selection, voltage scaling, power sequencing, etc. In certain aspects, the PMIC 224 includes one or more multiple-mode voltage regulators (e.g., low-dropout (LDO) regulator) as described herein and may be used for voltage regulation.

The various components of the device 200 may be coupled together by a bus system 226, which may include a power bus, a control signal bus, and a status signal bus in addition to a data bus.

Example Multiple-Mode Voltage Regulator

Certain aspects of this present disclosure generally relate to multiple-mode voltage regulators (e.g., LDOs) using replica devices. Using replica devices for voltage regulation during mode transitions, as described herein, may provide several advantages, including improving voltage under/overshoot during mode transitions. Therefore, by improving the voltage under/overshoot via a replica device implementation, the output voltage of the regulators may be initially more accurate during a mode transition compared to a regulator not configured with replica devices. Moreover, improving the output voltage accuracy during mode transitions may translate to improved overall system efficiency.

Figure 3:
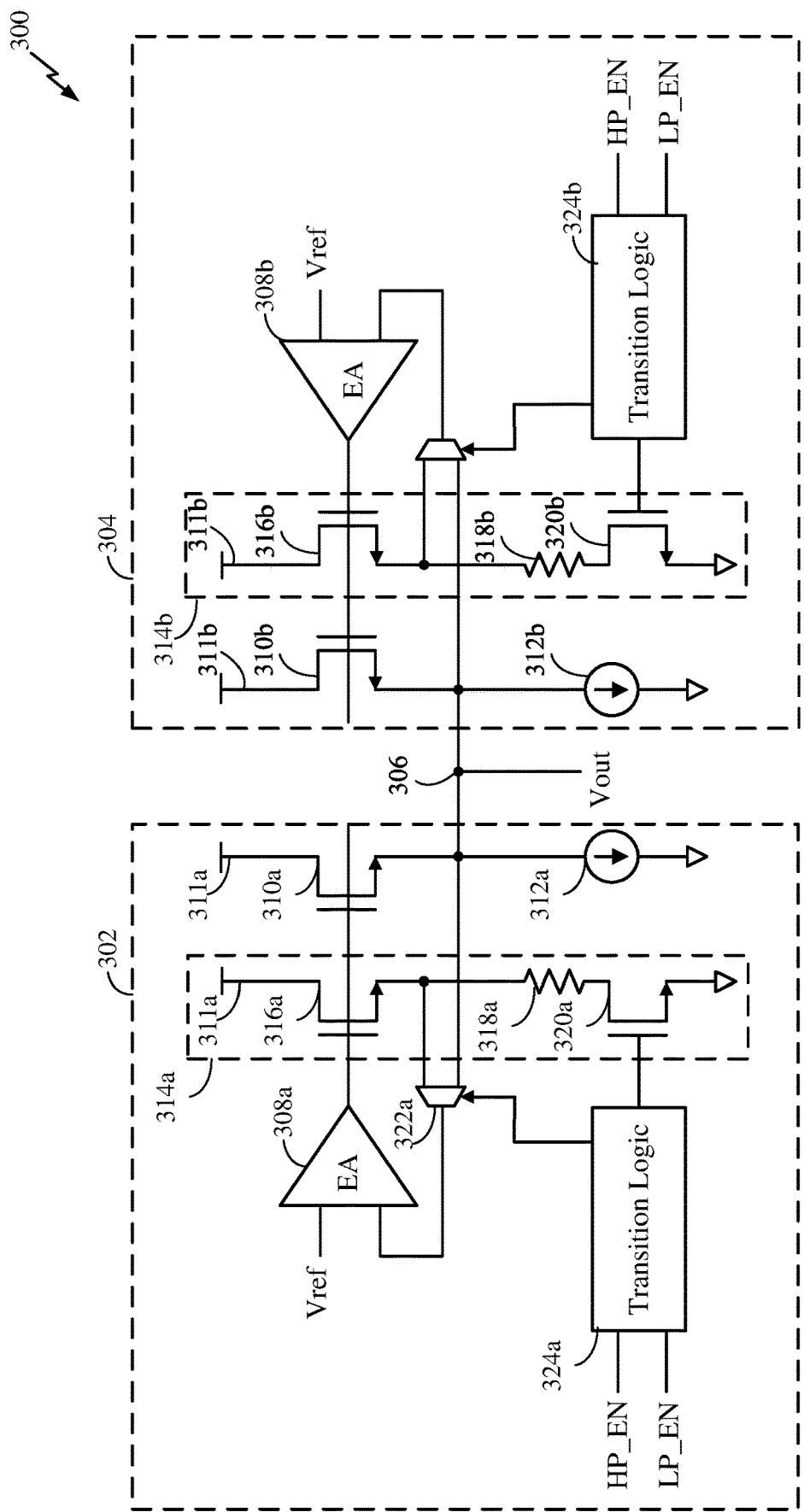
FIG. 3 illustrates an example implementation of multiple-mode voltage regulator using replica power devices, in accordance with certain aspects of the present disclosure.

FIG. 3 illustrates an example multiple-mode voltage regulator 300 using power replica devices, in accordance with certain aspects of the present disclosure. In one implementation, the multiple-mode voltage regulator 300 includes a first voltage regulator 302 and a second voltage regulator 304. Each of the voltage regulators have an output coupled to the voltage output (Vout) at node 306 and are configured to operate in respective power modes. A power mode may be defined by one or more operational characteristics of the voltage regulator. For example, a power mode may be defined by characteristics such as the quiescent current, slew rate, output current, voltage output range, or any other characteristic attributable to the performance of the voltage regulator. Thus, one voltage regulator may operate in a "low power" mode having a low quiescent current to improve power efficiency. Improved power efficiency may result in increased battery life of a battery-operated device. However, the low quiescent current may come at a trade-off of lower output current or slower transient response to a load current. The other voltage regulator may operate in a "high power" mode having boosted performance with respect to higher required load currents than the "low power" mode which may be at the cost of a higher quiescent current. Accordingly, the "low power" mode may be suitable for periods of time a device is operating at low operation loads (e.g., a standby mode where one or more components are disabled for power-savings) while the "high power" mode may be suitable for a period of time of active device use which may have high operational loads (e.g., one or more processors under heavy computational load).

In the exemplary implementation of FIG. 3, each voltage regulator 302, 304 is configured as a low dropout (LDO) regulator having an error amplifier 308, a pass transistor 310 coupled to a voltage supply 311 and a current source 312, and a replica device 314 comprising a replica pass transistor 316, resistor 318, and a bias current transistor 320. Each error amplifier 308 has a first input coupled to a reference voltage (Vref) and a second input configured to be selectively coupled to either Vout or to the output of the replica pass transistor 316. In the illustrative example of FIG. 3, the second input is selectively coupled via a multiplexer 322 having an input coupled to Vout, an input coupled to the output of the replica pass transistor 316, and an output coupled to the second input of the error amplifier 308. The multiplexer 322 is controlled by transition logic 324 configured to determine a transition between power modes of the first and second voltage regulator. For example, voltage regulator 302 may be associated with a "low power" mode while voltage regulator 304 may be associated with a "high power" mode. The transition logic 324 is further configured to control the gate of the bias current transistor 320. In another implementation, the bias current transistor 320 may be controlled independently from the transition logic 324 or replaced with a current source. The transition logic 324 may be made up of various hardware elements formed on an integrated circuit, formed from discrete components, implemented in software, or a combination thereof. The transition logic 324 is discussed in more detail below with respect to FIGS. 4A and 4B.

In one implementation, the transition logic 324 is configured to receive the enable signal for voltage regulator 302 (i.e., LP_EN) and voltage regulator 304 (i.e., HP_EN). The enable signals are each configured to enable the respective voltage regulator to provide regulation of Vout. By receiving the enable signals for each of the voltage regulators 302, 304, the transition logic 324 is able to determine a transition from one power mode into the power mode of the associated voltage regulator. When a transition into the power mode of the associated voltage regulator is determined, the transition logic 324 controls the multiplexer via a transition signal to select the input coupled to the voltage output of the replica pass transistor 316 as the output to be coupled to the input of the error amplifier 308 for a transition period. In addition, the transition logic 324 will provide a bias voltage for the bias current transistor 320 to provide, in combination with resistor 318, a bias current for operation of the replica pass transistor 316. Accordingly, during the transition period, the error amplifier 308 controls the gate bias (i.e., gate voltage) of the pass transistor 310 and the replica pass transistor 316 using the voltage output (i.e., source voltage) of the replica pass transistor 316. During the transition period, the pass transistor 310, and therefore the output voltage of the voltage regulator, is controlled by the voltage output of the replica pass transistor 316 of the replica device 314. At the end of the transition period, the transition logic 324 controls the multiplexer 322 to select the input coupled to Vout at node 306 as the multiplexer 322 output to be coupled to the input of the error amplifier 308 so that the pass transistor 310 is controlled based on Vout.

Figure 1:
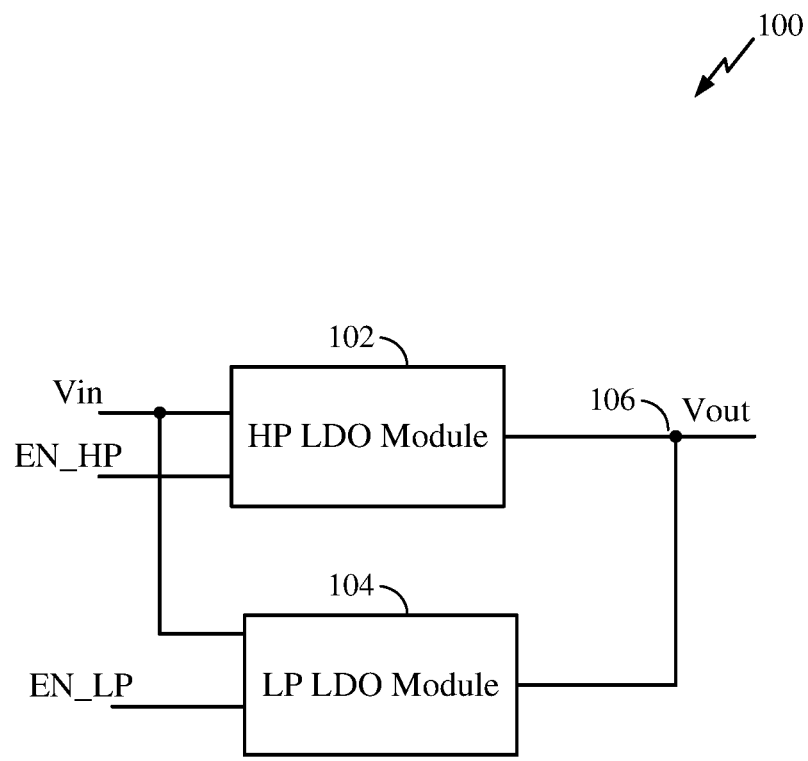
FIG. 1 illustrates a block diagram of a prior art dual-mode low-voltage dropout (LDO) regulators.

An exemplary benefit of controlling the output voltage of the voltage regulator during power mode transitions using a replica device is that faster and more accurate output voltage transitions may be achieved as compared to using the same output voltage node of two or more voltage regulators. For example, both voltage regulators may both be enabled during the transition period between power modes. When both voltage regulator use the same output voltage node for regulation, such as shown in prior art FIG. 1, each of the voltage regulators may be allowed to make independent decisions on how to regulate the voltage regulators (e.g., the amount of voltage to apply to the gate of the pass transistor). In such an instance, the transitioning voltage regulator may not appropriately control the output voltage as Vout may be sufficiently maintained by the other voltage regulator. However, once the other voltage regulator is turned off, Vout may see an over/undershoot due to, for example, insufficient biasing of the pass transistor of the transitioned voltage regulator. By using the output voltage of the replica device instead of the output voltage of the voltage regulator during the transition period, the transitioning voltage regulator may more accurately bias the pass transistor using the replica device while the other voltage regulator backs down its output voltage due to the regulation activity of Vout by the transitioning voltage regulator.

Figure 4A:
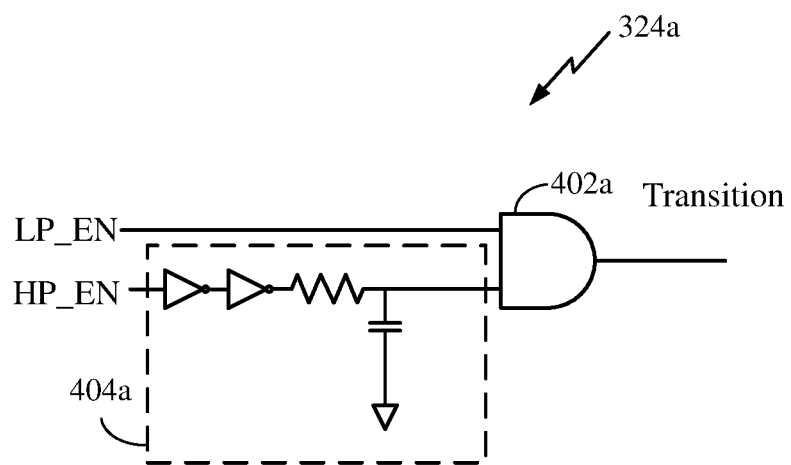
FIG. 4A illustrates an example implementation of low-power mode-transition logic of FIG. 3, in accordance with certain aspects of the present disclosure.

Referring now to FIG. 4A, an example implementation of a low-power mode-transition logic 324a of FIG. 3, in accordance with certain aspects of the present disclosure. The low-power mode-transition logic 324a includes an AND logic gate 402a with a first input coupled to the low-power mode enable signal (i.e., LP_EN), a second input coupled to the high-power enable signal (i.e., HP_EN) via a delay element 404a, and an output configured to output the transition control signal. The delay element 404a is configured to at least partly define the transition period for transitioning between the high-power mode and the low-power mode by delaying the propagation of the HP_EN signal to the input. In the illustrated example of FIG. 4A, the delay element 404a includes a pair of inverters and a resistor-capacitor (RC) circuit configured to delay the HP_EN for transition period. However, any suitable topology for delaying a signal may be implemented. In addition, the transition period may also include a time when both the HP_EN and LP_EN signals are enabled (i.e., logic value of "1") at the same time by the associated control logic responsible for generating the HP_EP and LP_EN signals. During a transition from a high-power mode to the low-power mode when the LP_EN signal indicates a logic level of "1", the AND logic gate 402a will output a logic value of "1" for at least period of time defined by the delay element 404a even when HP_EN is disabled as indicated by a logic level of "0". The output of the AND logic gate 402a, herein referred to as the transition signal, may be used to control various components of the voltage regulator 302 during a power mode transition. For example, the output of the transition signal may be used to control the input selection of the multiplexer 322a so that the multiplexer couples the voltage output of the replica pass transistor 316a to the second input of the error amplifier 308a. The transition signal may directly or indirectly control the bias of the bias current transistor 320a. Additionally, the transition signal may be used to control various other circuitry of the voltage regulator such as described herein with respect to FIG. 5.

Figure 4B:
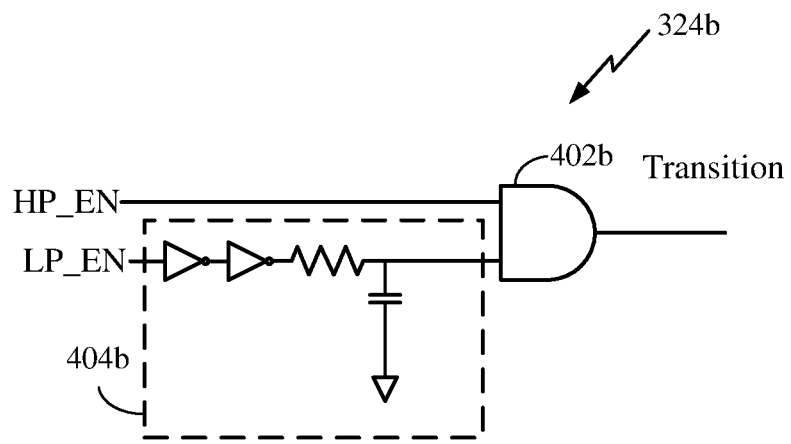
FIG. 4B illustrates an example implementation of high-power mode-transition logic of FIG. 3, in accordance with certain aspects of the present disclosure.

FIG. 4B illustrates an example implementation of high-power mode transition logic 324b of FIG. 3, in accordance with certain aspects of the present disclosure. Similar to the low-power mode-transition logic 324a of FIG. 4A, the high-power mode transition logic 324b includes an AND logic gate 402b and a delay element 404b. However, the first input of the AND logic gate 402b is coupled to the HP_EN signal and the LP_EN signal is coupled to the second input of the AND logic gate 402b via the delay element 404b. Accordingly, the delay element 404b is configured to at least partly define the transition period for transitioning between the low-power mode and the high-power mode by delaying the propagation of the LP_EN signal to the input. In addition, the transition period may also include a time when both the HP_EN and LP_EN signals are enabled (i.e., logic value of "1") akin to the relevant discussion of FIG. 4A. During a transition from the low-power mode to the high-power mode when the HP_EN signal indicates a logic level of "1", the AND logic gate 402b will output a logic value of "1" (i.e., transition signal) for at least period of time defined by the delay element 404b even when LP_EN is disabled as indicated by a logic level of "0". Similar to the low-power mode-transition logic 324a, the transition signal of the high-power mode transition logic 324b may be used to control various components of voltage regulator 304.

By delaying the respective enable signal (i.e., HP_EN and LP_EN), the low-power mode-transition logic 324a and the high-power transition logic 324b may determine a transition from one power mode into the power mode associated with a particular voltage regulator 302,304 and control the transition accordingly. For example, the high-power mode may require a longer transition time than transitioning into the low-power mode due to varying operational parameters between the power modes. The transition times of the low-power mode-transition logic 324a and the high-power transition logic 324b may be varied by using different values of R and C and/or by implementing additional pair(s) of inverters. The longer transition time allows the voltage regulator 302,304 associated with the high-power mode to regulate the bias of the pass transistor 310 using the voltage output of the replica device 314 prior to regulating the bias using Vout.

Figure 5:
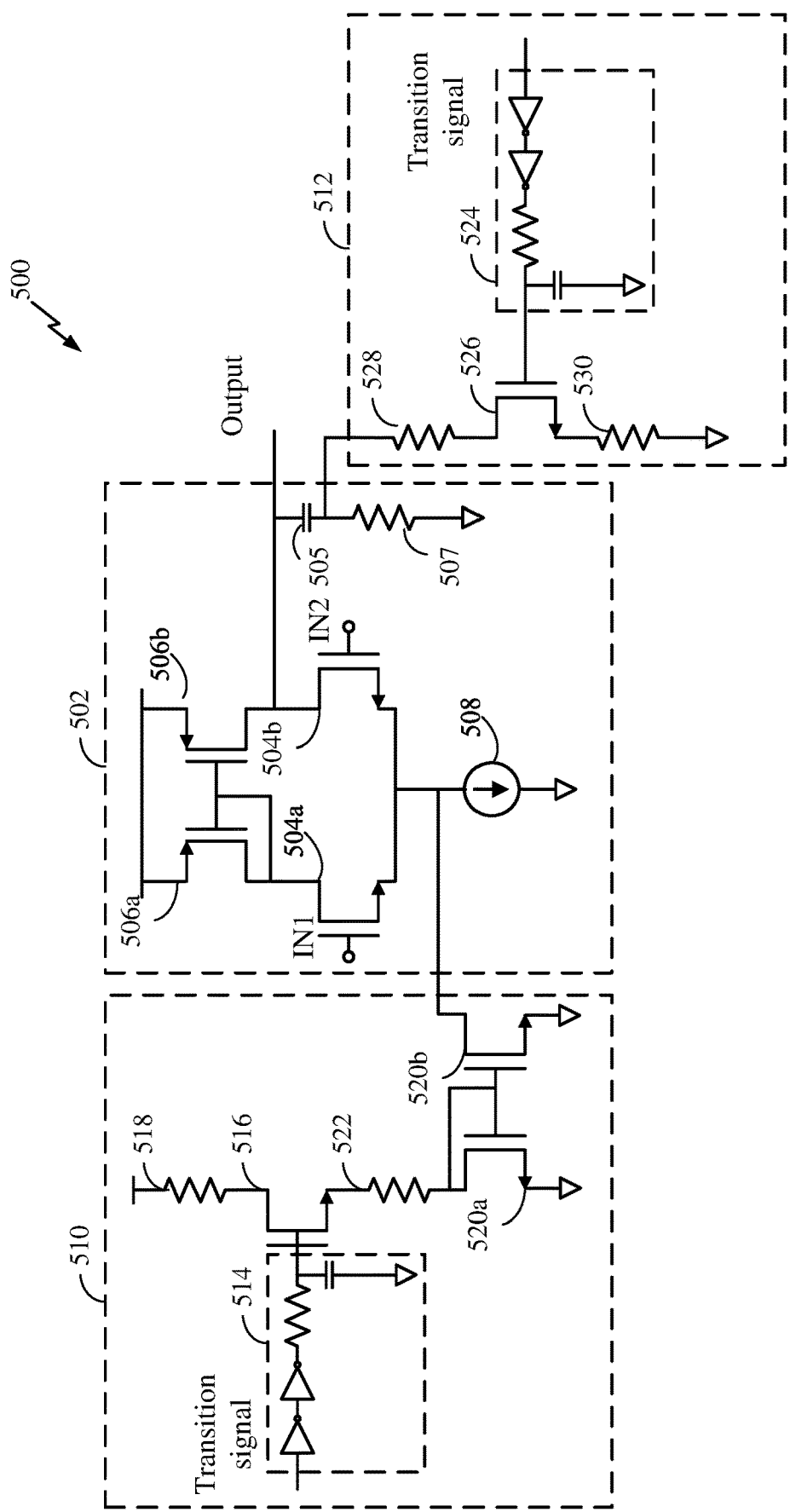
FIG. 5 illustrates an example implementation of the error amplifier stage of FIG. 3, in accordance with certain aspects of the present disclosure.

Referring now to FIG. 5, an example implementation 500 of the error amplifier 308 of FIG. 3 is shown, in accordance with certain aspects of the present disclosure. The error amplifier 308 includes error amplifier circuitry 502 configured to output an amplified difference between a first input signal IN1 and a second input signal IN2. The error amplifier circuitry 502 comprises a first input transistor 504a having a gate coupled to IN1 and a second input transistor 504b having a gate coupled to IN1. The error amplifier circuitry 502 further includes a current mirror comprising first and second transistors 506a-b. The first transistor 506a and the second transistor 506b have sources connected to a voltage rail. The gates of the first and second transistors 506a-b are coupled to each other and are further coupled to the drain of the first transistor 506a. The drain of the first transistor 506a is further coupled to the drain of the first input transistor 504a while the drain of the second transistor 506b is coupled to the output and the drain of the second input transistor 504b. A RC circuit comprising a capacitor 505 and a resistor 507 is coupled to the output and to ground. The RC circuit is configured to adjust the frequency response of the output of error amplifier circuitry 502. The error amplifier circuitry 502 further includes a current source 508 coupled to the sources of the first and second input transistors 504a-b and ground.

In one implementation, the error amplifier 308 further includes a quiescent current boost circuitry 510 and zero-adjust circuitry 512. The quiescent current boost circuitry 510 is configured increase the quiescent bias current of the error amplifier circuitry 502 to improve the transient response of the error amplifier circuitry 502. The quiescent current boost circuitry 510 may be configured to be selectively enabled by the transition signal of the associated transition logic 324 of the voltage regulator. A benefit of selective enabling of the quiescent current boost circuitry 510 is that the quiescent current may only be increased during power mode transitions, which may require a faster transient response, while maintaining a lower quiescent current during normal operation to improve power efficiency.

In one implementation, the quiescent current boost circuitry 510 comprises a delay element 514 configured to receive the transition signal from transition logic 324 and coupled to the gate of a boost enable transistor 516. The delay element 514 comprises two inverters and a RC circuit configured to delay the propagation of the transition signal to the gate of the boost enable transistor 516. However, it should be noted that the delay element 514 may be configured accordingly to any number of various topologies configured to delay signal propagation. The boost enable transistor 516 has a drain coupled to a supply rail via a first resistor 518 and a source coupled a current mirror comprising two transistors 520a-b via a second resistor 522. Each of the first and second resistors may consist of half the resistance value of a total resistance value R. In operation, when the gate of the boost enable transistor 516 receives the transition signal, the boost enable transistor turns "on" and begins conducting current from the supply rail which increases the voltage seen at the gates of the two transistors 520a-b of the current mirror. The increased voltage turns the two transistors 520a-b "on" to be conducting current to ground via the sources of the two transistor 520a-b. Since the drain of transistor 520b is coupled to the drains of the first and second input transistors 504a-b, the conducted current in transistor 520b increases the quiescent bias current of the error amplifier circuitry 502.

A benefit of the quiescent current boost circuitry 510 being enabled by a delayed transition signal is that it allows the associated voltage regulator to adjust more slowly to an initial regulation enable condition where Vref (e.g., 5V) may be much larger than the voltage output of the replica device 314 (e.g., 0V). This slower adjustment of the large initial difference may improve the overall stability while enabling the improved transient response via quiescent current boost circuitry 510 when voltage output of the replica device has had some time to adjust closer to Vref. Furthermore, the delayed transition signal allows for the increased quiescent current to persist for some time after the multiple-mode voltage regulator has transitioned power modes. Accordingly, the error amplifier may adjust more quickly to sudden voltage under/overshoots when switching fully between voltage regulators (i.e., the voltage regulator of the previous power mode being disabled) as compared to only using the quiescent bias current provided by current source 508.

The zero-adjust circuitry 512, in one example implementation, includes a delay element 524 comprising a pair of inverters and an RC circuit. The delay element 524 is configured to delay the propagation of the transition signal received at the input of the delay element 524 to the gate of a zero-adjust enable transistor 526 coupled to the delay element 524. The zero-adjust circuitry 512 further includes a first resistor 528 coupled having a first terminal coupled to the drain of the zero-adjust enable transistor 526 and a second terminal coupled between the capacitor 505 and resistor 507 of the RC circuit of the error amplifier circuitry 502. The zero-adjust circuitry 512 additionally includes second resistor 530 having a first terminal coupled to the source of the zero-adjust enable transistor 526 and a second terminal coupled to ground. The first resistor 528 and the second resistor 530 may each comprise half the resistance value of a total resistance value R or any other suitable resistance value depending on the desired application.

In operation, the zero-adjust circuitry 512 is configured to adjust the frequency response of the output of the error amplifier circuitry 502 as defined by at least the component values of capacitor 505 and resistor 507. The frequency response is adjusted by at least adjusting a zero of the transfer function defining the frequency response of the output of the error amplifier circuitry 502. The zero is adjusted when the transition signal is asserted on the gate of zero-adjust enable transistor 526. While the zero-adjust enable transistor 526 has the transition signal asserted on the gate, the zero-adjust enable transistor 526 conducts current thereby putting the first and second resistors 528,530 in parallel with resistor 507 of the error amplifier circuitry 502. Accordingly, the resistance of the RC circuit, normally defined by the resistance of resistor 507, is decreased due to the addition of the parallel resistance of the first and second resistors 528,530 thereby adjusting a zero of the transfer function of the error amplifier circuitry 502.

A benefit of adjusting the transfer function of the error amplifier circuitry 502 is that stability of the error amplifier circuitry 502 may be improved during periods of time that the error amplifier circuitry 502 is making faster and/or larger corrections due to voltage mismatch between IN1 and IN2. For example, when a voltage regulator initial regulates using the voltage output of the replica device 314 instead of Vout, there may be a significant difference between Vref and the voltage output of the replica device 314. Furthermore, when the quiescent current boost circuitry 510 is enabled the transient performance of the error amplifier circuitry 502 is improved allowing for faster adjustments of the output voltage of the error amplifier circuitry 502. By adjusting the frequency response of the error amplifier circuitry during such times of fast and/or large corrections, stability of the error amplifier circuitry 502 may be maintained. Accordingly, the delay element 514 of quiescent current boost circuitry 510 and the delay element 524 of the zero-adjust circuitry 512 may be configured to delay the propagation of the transition signal by the same, or at least similar, amount of time or alternatively by a time offset. A time offset may be useful, for example, in instances where the time to enable the quiescent current boost circuitry 510 and zero-adjust circuitry 512 is different so that operation may be better coordinated between the improved transient response and frequency response adjustment.

Figure 6:
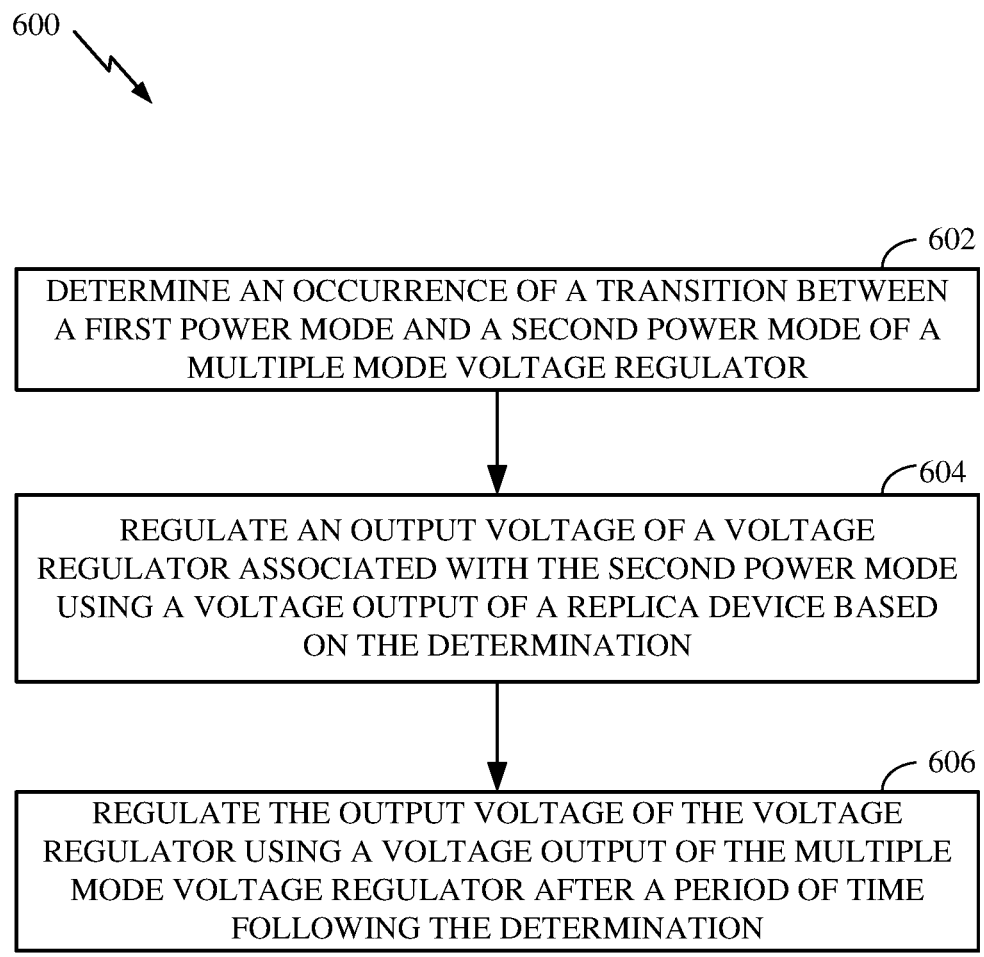
FIG. 6 illustrates an example operation of a dual-mode LDO regulation method using power replica devices, in accordance with certain aspects of the present disclosure.

Referring now to FIG. 6, an example operation of a multiple-mode voltage regulation method 600 using power replica devices is illustrated.

At block 602, an occurrence of a transition between a first power mode and a second power mode of a multiple-mode voltage regulator is determined (e.g., by transition logic 324a or transition logic 324b as described above)". In one implementation, the occurrence is determined by monitoring the enable signals for each of the voltage regulators of a multiple-mode voltage regulator. For example, the voltage regulators each may comprise a LDO regulator. The enable signal is configured to initiate voltage regulating of an output voltage by a LDO associated with a particular power mode of operation as defined by one or more operational characteristics of the LDO. Accordingly, by monitoring the enable signals indicative of LDO operation, a transition from one LDO to a different LDO can be detected.

At block 604, an output voltage of a voltage regulator associated with the second power mode is regulated using a voltage output of a replica device based on the determination. The replica device comprises at least a replica of the pass transistor of a voltage regulator comprising an LDO. In one implementation, the LDO is configured to regulate the output voltage of the LDO by biasing the pass transistor. When the LDO is regulated using the replica device, the pass transistor and the replica pass transistor are biased based on a difference between a reference voltage and the output voltage of the replica device. In one implementation, the voltage output of the replica device is selectively coupled to an error amplifier to provide a bias based on the reference voltage and the voltage output of the replica device as compared to the output of the LDO. In addition, other components of the LDO may be enabled based on the determination. For example, the quiescent current and/or output resistance for an error amplifier of the LDO may be adjusted based on the determination. Accordingly, operation of the LDO may be further modified when regulating the LDO using the output voltage of the replica device.

At block 606, the output voltage of the voltage regulator is regulated using a voltage output of the multiple-mode voltage regulator after a period of time following the determination. The period of time may be determined at least in delay logic configured to delay the propagation of an enable signal of a voltage regulator. For example, the period of time may be defined by a time when an enable signal for the voltage regulator associated with the first power mode and an enable signal for the voltage regulator associated with the second power mode are both asserted. The logic responsible for asserting the enable signals may assert the two enable signals for at least a partially overlapping period. However, even in instances where the assertion of the enable signals do not overlap, the delay logic may be configured to delay an indication of one of the enable signals being unasserted. The delay logic may be configured in hardware, software, or any combination thereof. In another implementation, the period of time may be defined via a timer that is triggered by the determination.

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering.

In certain aspects, means for determining an occurrence of a transition between a first power mode and a second power mode may include logic such as the transition logic 324. In certain aspects, means for regulating an output voltage associated with the first power mode the multiple-mode voltage regulator may include a voltage regulator such a voltage regulator 302. In certain aspects, means for regulating an output voltage associated with the second power mode the multiple-mode voltage regulator using either a voltage output of a replica device or a voltage output of the multiple-mode voltage regulator based on the determined occurrence of the transition may include a voltage regulator such as voltage regulator 304. In certain aspects, means for selecting may include a multiplexer such as multiplexer 322. In certain aspects, means for delaying may include delay circuitry such as delay logic 404.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with discrete gate or transistor logic, discrete hardware components, or any combination thereof designed to perform the functions described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A multiple-mode voltage regulator, comprising:
   a first voltage regulator comprising:
      a first transistor having an output coupled to a voltage output of the multiple-mode voltage regulator;
      a second transistor having an output; and
      an error amplifier having a first input coupled to a first reference voltage, a second input configured to be selectively coupled between either the voltage output of the multiple-mode voltage regulator or the output of the second transistor, and an output coupled to a gate of the first transistor and a gate of the second transistor;
   a second voltage regulator having an output coupled to the voltage output of the multiple-mode voltage regulator; and
   a multiplexer having a first input coupled to the voltage output of the multiple-mode voltage regulator and a second input coupled to the output of the second transistor, and an output coupled to the second input of the error amplifier.

2. The multiple-mode voltage regulator of claim 1, wherein the first voltage regulator is configured to operate in a first power mode and the second voltage regulator is configured to operate in a second power mode.

3. The multiple-mode voltage regulator of claim 2, wherein the multiplexer is configured to selectively couple the voltage output of the multiple-mode voltage regulator or the output of the second transistor to the second input of the error amplifier based on a transition between the first and second power modes.

4. The multiple-mode voltage regulator of claim 3, further comprising transition logic configured to control the multiplexer, the transition logic having inputs configured to receive an enable signal for the first power mode and an enable signal for the second power mode.

5. The multiple-mode voltage regulator of claim 4, wherein the transition logic comprises a delay element configured to receive the enable signal for the second power mode.

6. The multiple-mode voltage regulator of claim 1, wherein the second voltage regulator comprises:
   a first transistor having an output coupled to the voltage output of the multiple-mode voltage regulator;
   a second transistor having an output; and
   an error amplifier having a first input coupled to a second reference voltage, a second input configured to be selectively coupled between either the voltage output of the multiple-mode voltage regulator or the output of the second transistor of the second voltage regulator, and an output coupled to a gate of the first transistor of the second voltage regulator and a gate of the second transistor of the second voltage regulator.

7. The multiple-mode voltage regulator of claim 1, wherein the error amplifier further comprises a quiescent current boost circuit configured to selectively increase a quiescent current on the error amplifier.

8. The multiple-mode voltage regulator of claim 7, wherein the quiescent current is configured to be selectively increased based on a transition between the first and second power modes.

9. The multiple-mode voltage regulator of claim 1, wherein the error amplifier further comprises a zero-adjust circuit configured to selectively adjust an output resistance of the error amplifier.

10. The multiple-mode voltage regulator of claim 9, wherein the output resistance is configured to be selectively adjusted based on a transition between the first and second power modes.

11. A method of multiple-mode voltage regulation, the method comprising:
   determining an occurrence of a transition between a first voltage regulator associated with a first power mode and a second voltage regulator associated with a second power mode of a multiple-mode voltage regulator;
   regulating an output voltage of the second voltage regulator associated with the second power mode using a voltage output of a replica device associated with the second power mode by selectively coupling the output voltage of the replica device to an input of an error amplifier of the second voltage regulator based on the determination;
   regulating the output voltage of the second voltage regulator using a voltage output of the multiple-mode voltage regulator by selectively coupling the voltage output of the multiple-mode voltage regulator to the input of the error amplifier after a period of time following the determination.

12. The method of claim 11, wherein the replica device comprises a replica of a pass transistor of the second voltage regulator; and
   wherein regulating the output voltage of the second voltage regulator associated with the second power mode using the voltage output of the replica device comprises biasing the replica device based on the voltage output of the replica device.

13. The method of claim 12, further comprising biasing the pass transistor replica device based on the voltage output of the replica device during the period of time.

14. The method of claim 13, further comprising biasing the pass transistor replica device based on the voltage output of the multiple-mode voltage regulator after the period of time.

15. The method of claim 11, further comprising adjusting a quiescent current of the error amplifier of the second voltage regulator during at least a portion of the period of time.

16. The method of claim 11, further comprising adjusting an output resistance of the second voltage regulator during at least a portion of the period of time.

17. The method of claim 11, wherein the determination is based on an enable signal associated with the first power mode and an enable signal associated with the second power mode.

18. The method of claim 17, wherein the first power mode is associated with a higher power of operation than the second power mode.

19. The method of claim 17, wherein the period of time is based on delaying the enable signal associated with the first power mode.

20. A multiple-mode voltage regulator, comprising:
a first low dropout (LDO) regulator configured to operate in a first power mode, the first LDO further configured to selectively adjust an output voltage using one of a voltage output of a replica pass transistor of the first LDO or a voltage output of a pass transistor of the first LDO based on a transition from a second power mode to the first power mode;
wherein the voltage output of the replica pass transistor is connected to an input of a multiplexer; and
wherein the voltage output of the pass transistor is coupled to another input of the multiplexer and a voltage output of the multiple-mode voltage regulator.

21. The multiple-mode voltage regulator of claim 20, further comprising:
a second LDO regulator configured to operate in the second power mode, the second LDO further configured to selectively adjust an output voltage using one of a voltage output of a replica pass transistor of the second LDO or a voltage output of the pass transistor of the second LDO based on a transition from the first power mode to the second power mode.

22. The multiple-mode voltage regulator of claim 20, wherein the first LDO further comprises an error amplifier having a first input coupled to a reference voltage, a second input coupled to an output of the multiplexer, and an output coupled a gate of the pass transistor and a gate of the replica pass transistor.

23. The multiple-mode voltage regulator of claim 22, further comprising a quiescent current boost circuit configured to adjust a quiescent current of the error amplifier during at least a portion of the transition.

24. The multiple-mode voltage regulator of claim 22, further comprising a zero-adjust circuit configured to adjust an output resistance of the error amplifier during at least a portion of the transition.

25. The multiple-mode voltage regulator of claim 22, wherein the output of the multiplexer is based on an enable signal associated with the first power mode and an enable signal associated with the second power mode.

26. A multiple-mode voltage regulator, comprising:
means for determining an occurrence of a transition between a first power mode and a second power mode;
means for regulating an output voltage associated with the first power mode of the multiple-mode voltage regulator; and
means for regulating an output voltage associated with the second power mode of the multiple-mode voltage regulator using either a voltage output of a replica device or a voltage output of the multiple-mode voltage regulator based on the determined occurrence of the transition;
wherein the means for determining comprises means for delaying a power mode enable signal by a time period; and
wherein a time to complete the transition is based on the time period.

27. The multiple-mode voltage regulator of claim 26, further comprising means for selecting either the voltage output of the replica device or the voltage output of the multiple-mode voltage regulator, the selecting based on determined occurrence of the transition.

28. The multiple-mode voltage regulator of claim 27, wherein the voltage output of the replica device is configured to be selected during the transition; and
wherein the voltage output of the multiple-mode voltage regulator is configured to be selected upon a completion of the transition.

* * * * *